(12) United States Patent
Vichare et al.

(10) Patent No.: US 11,599,834 B2
(45) Date of Patent: Mar. 7, 2023

(54) OFFER DRIVEN DEEP LEARNING CAPABILITY

(71) Applicant: Dell Products L.P., Round Rock, TX (US)

(72) Inventors: Nikhil Vichare, Austin, TX (US); Tyler R. Cox, Austin, TX (US); Marc R. Hammons, Round Rock, TX (US); Spencer G. Bull, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 610 days.

(21) Appl. No.: 16/683,980

(22) Filed: Nov. 14, 2019

(65) Prior Publication Data

US 2021/0150426 A1    May 20, 2021

(51) Int. Cl.
  *G06Q 10/04* (2012.01)
  *G06N 3/08* (2006.01)
  *G06N 3/04* (2006.01)

(52) U.S. Cl.
  CPC ............. *G06Q 10/04* (2013.01); *G06N 3/04* (2013.01); *G06N 3/08* (2013.01)

(58) Field of Classification Search
  None
  See application file for complete search history.

(56) References Cited

U.S. PATENT DOCUMENTS

| | | | |
|---|---|---|---|
| 10,382,358 B1* | 8/2019 | Jain | H04L 43/16 |
| 2011/0016414 A1* | 1/2011 | Ernst | G06F 8/63 |
| | | | 715/764 |
| 2019/0026786 A1* | 1/2019 | Khoury | G06Q 30/0271 |

* cited by examiner

*Primary Examiner* — Roy Y Yi
(74) *Attorney, Agent, or Firm* — Terrile, Cannatti & Chambers, LLP; Emmanuel A. Rivera

(57) ABSTRACT

A system, method, and computer-readable medium are disclosed for configuring and offering upgrade capability to information handling systems. A deep learning or machine learning model (DL/ML) model is trained to optimize a particular configuration and use cases for an information handling system and provides various levels of upgrades for the use cases. Levels are identified as base or upgrade and mapped to a licensing layer that enables or disables use of performance levels based on weights that enable base output level classes and disable upgrade output level classes. An offer to upgrade is made as to upgrade levels upon a determination of probabilities of performance output level classes.

20 Claims, 5 Drawing Sheets

OFFER DRIVEN DEEP LEARNING CAPABILITY

BACKGROUND OF THE INVENTION

Field of the Invention

The present invention relates to the management of information handling systems. More specifically, embodiments of the invention provide a system, method, and computer-readable medium for configuring and offering upgrade capability of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems perform various operations and include different resources to perform such operations. Operations can include computational processing (e.g., central processing unit), read/write to memories (e.g., random access memory, read only memory, storage, etc.), power management (e.g., battery, charging), input/output (I/O), etc. The operations and the resources that perform such operations, can be optimized through applications, such as software applications, that can include deep learning (DL) or machine learning (ML) models. Furthermore, such applications and models may provide critical capabilities such as adaptive battery management, customized performance optimization, smart alerts etc.

Such applications and their DL/ML models may be pre-installed on information handling systems and provide particular levels of performance. There can also be preinstalled applications directed to various device features, security options, warranties, etc. If a user of an information handling system desires to perform an upgrade as to applications which can include DL/ML models that optimize performance, the user may have to determine the level of performance that is optimal and undertake a complicated installation or re-installation procedure of the application and/or models. Furthermore, providers of such applications and models may have to maintain and deploy multiple versions of the applications and models.

SUMMARY OF THE INVENTION

A system, method, and computer-readable medium are disclosed for configuring and providing upgrades to optimize information handling systems. A deep learning or machine learning model (DL/ML) model is trained to optimize a particular configuration and use case for an information handling system and provide output level classes. Output level classes are identified as base or upgrade and mapped to a licensing layer that enables or disables use of performance levels based on weights that enable base output level classes and disable upgrade output level classes. An offer to upgrade is made as to output level classes upon a determination of probabilities of performance output level classes.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
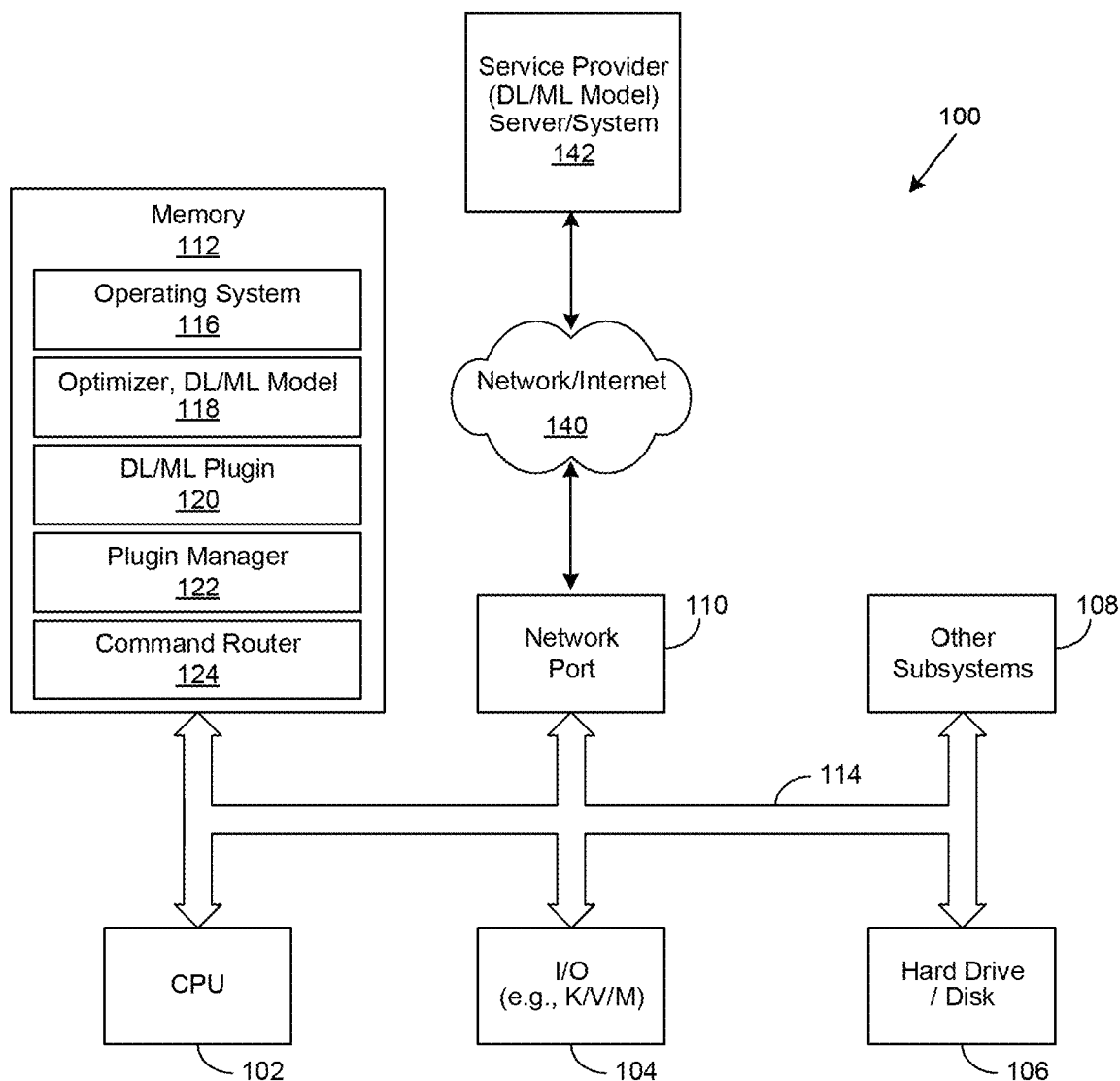
FIG. 1 is a general illustration of components of an information handling system implementing a machine learning model for resource optimizing.

A system, method, and computer-readable medium are disclosed for configuring and offering upgrade capability to deep learning/machine learning models that optimize information handling systems. An information handling system can include an optimizer that optimizes operations on the information handling system. Operations performed on the information handling system can include computational processing (e.g., central processing unit), read/write to memories (e.g., random access memory, read only memory, storage, etc.), power management (e.g., battery, charging), input/output (I/O), etc. The optimizer can be implemented in software, firmware, etc.

The optimizer can be implemented as a data vault application. In certain implementations, the optimizer or data vault is operated on the edge of the information handling system. The optimizer can be part of an application, that includes deep learning (DL) or machine learning (ML) model. The applications and/or models can be preinstalled on the information handling system. In certain implementations, DL/ML model is trained to determine levels of performance as to the particular information handling system on which the application and/or DL/ML model is installed. The DL/ML model can include artificial neural networks that are configured to receive various inputs from information handling system to determine optimal performance levels particular to that information handling system. When levels of performance are identified, a user is offered an upgrade to levels of performance that optimize the capability of the information handling system. If a user or administrator of the information handling system decides to upgrade to the offered or suggested performance level capability, the DL/ML model provides the capabilities. In certain implementations which use artificial neural networks, a licensing layer with various levels of performance is switched or flipped from previous performance level conditions to accepted upgraded performance level conditions.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

FIG. 1 is a generalized illustration of an information handling system 100 that can be used to implement the system and method of the present invention. In particular, the information handling system 100 implements a machine learning model for resource optimizing. The information handling system 100 includes a processor (e.g., central processor unit or "CPU") 102, input/output (I/O) devices 104, such as a microphone, a keyboard, a video/display, a mouse, and associated controllers (e.g., K/V/M), a hard drive or disk storage 106, and various other subsystems 108. In various embodiments, the information handling system 100 also includes network port 110 operable to connect to the network 140, which is likewise accessible by the service provider server 142. In certain implementations, the service provider server 142 provides deep learning (DL) or machine language (ML) models to the information handling system 100.

The information handling system 100 likewise includes system memory 112, which is interconnected to the foregoing via one or more buses 114. System memory 112 further includes an operating system (OS) 116 and in various embodiments may also include an optimizer or deep learning (DL) or machine learning (ML) model 118. The optimizer, DL/ML model 118 can be directed to how an individual (user) uses the information handling system 100 as to different parameters, such as computing processing, charging, discharging, battery, adapter, processing, memory, connections (110), etc. The optimizer, DL/ML model 118 can be implemented to optimize the resources of the information handling system 100. Examples of resources include computing (e.g., central processing unit), memory (e.g., random access memory, read only memory, storage, etc.), input/output (I/O), power (e.g., battery, charging), etc. In certain implementations, the system memory 112 can also include an DL/ML plugin runtime component 120, a plugin manager 122 and command router 124, which can be used in downloading/installing/managing configurations of the optimizer, DL/ML model 118.

Figure 2:
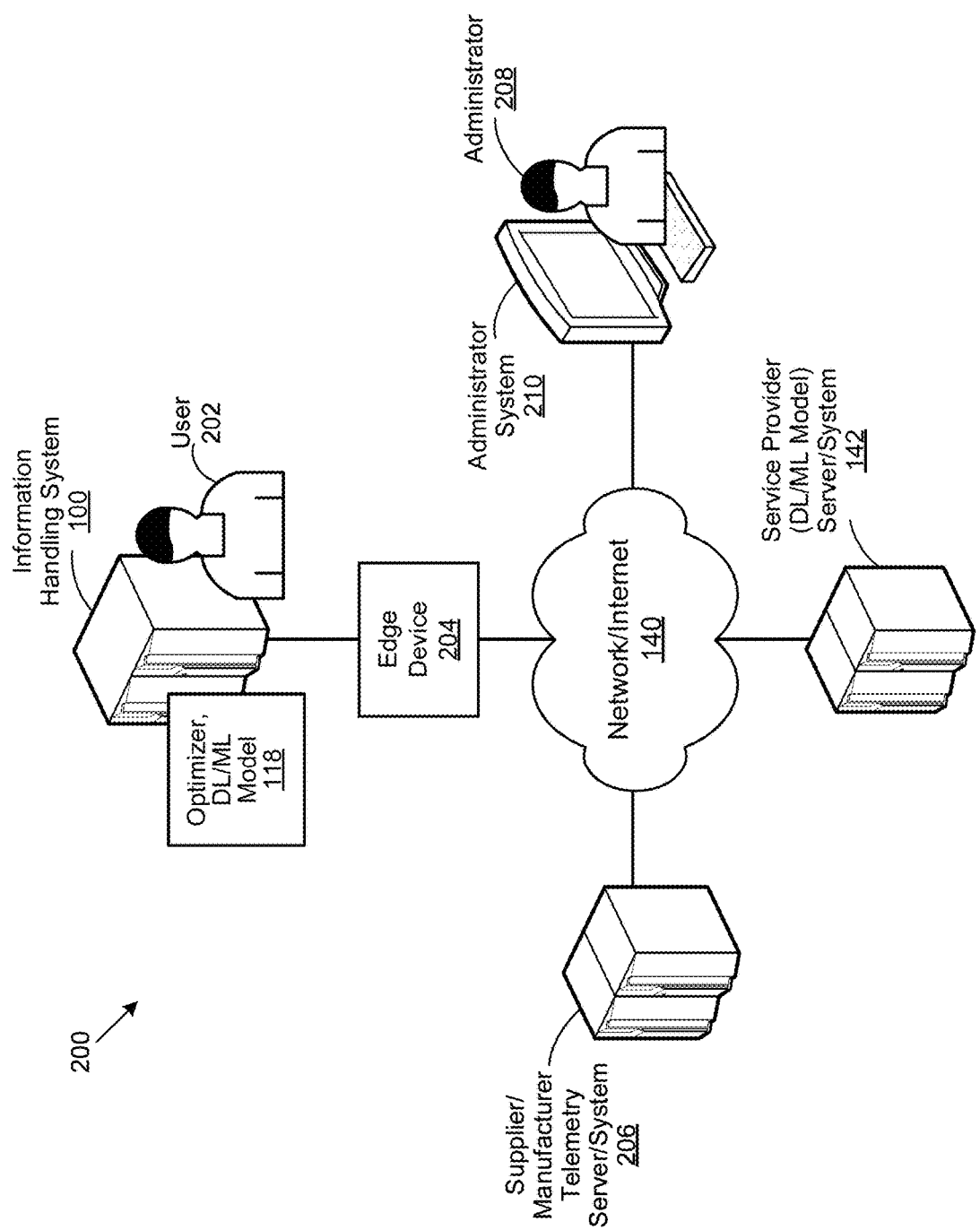
FIG. 2 is a simplified block diagram of a system for configuring and offering upgrade capability to deep learning/machine learning models that optimize information handling systems.

FIG. 2 is a simplified block diagram of a system 200 for configuring and offering upgrade capability to deep learning/machine learning (DL/ML) models that optimize information handling systems. The system 200 supports information handling system 100. As used herein, there can be different implementations of information handling system 100 such as a server computer, personal computer, a laptop computer, a tablet computer, a personal digital assistant (PDA), a smart phone, a mobile telephone, or other device that is capable of communicating and processing data. Information handling system 100 can be operated or controlled by a user 202. In certain implementations, the user 202 is offered and can request for an upgrade to levels of performance that optimize the capability of the information handling system 100.

As discussed, the information handling system 100 can include optimizer, DL/ML model 118. In certain implementations, the DL/ML model can include multi-tiered offerings other than an optimizer. The optimizer can be considered as a multi-tiered offering which can be upgraded. Other examples of multi-tiered offerings include applications directed software features, security options, product warranty, etc. In certain implementations, the multi-tiered offerings including the optimizer, DL/ML model 118 are part of a software, firmware, and/or a combination that can include hardware. In certain implementations, the multi-tiered offerings (e.g., optimizer), DL/ML model 118 is operated on the edge of the information handling system 100. Multi-tiered offerings (e.g., optimizer), DL/ML model 118 can be pre-installed on the information handling system 100. Preinstalled configurations of the multi-tiered offerings (e.g., optimizer), DL/ML model 118 can be implemented with standard performance level capability. The optimizer, DL/ML model 118 and/or various versions of the multi-tiered offerings (e.g., optimizer), DL/ML model 118 can also be downloaded to the information handling system 100.

The information handling system 100 and other various devices, systems, services (e.g., cloud systems/services), etc. of system 200 can be connected to one another through the network 140. In certain embodiments, the network 140 may be a public network, such as the Internet, a physical private network, a wireless network, a virtual private network (VPN), or any combination thereof. Skilled practitioners of the art will recognize that many such embodiments are possible, and the foregoing is not intended to limit the spirit, scope or intent of the invention.

In certain implementations, the information handling system 100 can be connected to an edge device 204, which connects to the network 140. The edge device 204 can be a device that can provides an entry point into an enterprise or service provider networks. Examples of such devices include routers, routing switches, integrated access devices (IADs), multiplexers, and metropolitan area network (MAN) and wide area network (WAN) access devices. Certain implementations allow for edge device 204 to download optimizer, DL/ML model 118 to the information handling system 100.

The multi-tiered offerings (e.g., optimizer), DL/ML model 118 and various versions may be stored at and provided by the service provider server 142. The service provider server 142 can provide the appropriate multi-tiered offerings (e.g., optimizer), DL/ML model 118 to information handling system 100. In certain embodiments, the service provider server 142 is implemented as a part of a cloud service. In certain implementations, the service provider server 142 connects to the DL/ML plugin runtime component 120 described in FIG. 1.

In certain embodiments, the system 200 includes a supplier/manufacturer telemetry server/system 206, which can connect to the information handling system 100. The supplier/manufacturer telemetry server/system 206 can provide other data/information to the information handling system 100, which can be related to resources of the information handling system 100. In certain embodiments, the supplier/manufacturer telemetry server/system 206 is implemented as a part of a cloud service.

In certain implementations, the system 200 can include various administrators as represented by administrator 208. Administrator 208 can be business units, such as product support units, marketing, product development, security administrators, information technology (IT), etc. For example, in certain implementations, an IT administrator can request for an upgrade to levels of performance that optimize the capability of the information handling system 100.

In general, administrator 208 can include entities that directly or indirectly involved in supporting user information handling system 100 and user 202. Administrator 208 interacts with other users/systems of system 200 using administrator system 210. In certain implementations, the administrator system 312 can be representative of a business/computing environment that includes various computing devices (e.g., servers), storage, software solutions, hardware (e.g., accessories), etc. In certain implementations, the administrator system 312 is part of a cloud service.

Figure 3:
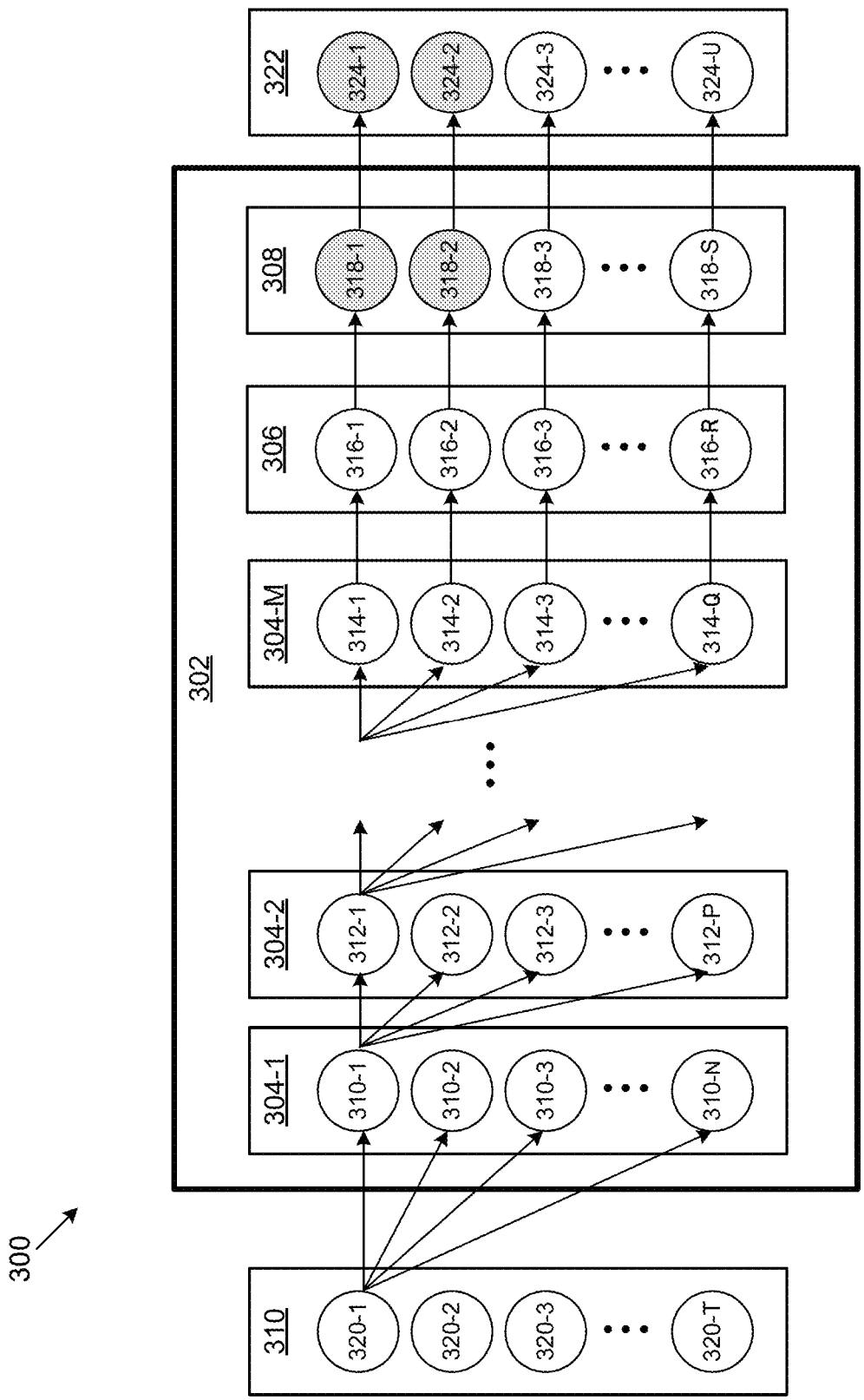
FIG. 3 is a simplified block diagram of a deep learning (DL) or machine learning (ML) model or DL/ML model, before an upgrade of multi-tiered offerings.

FIG. 3 is a block diagram of a deep learning (DL) or machine learning (ML) model or DL/ML model, before an upgrade of as to multi-tiered offerings. The DL/ML model 300 can be implemented using an artificial neural network 302. The artificial neural network 302 includes various layers 304-1, 304-2 to 304-M, 306 and 308. The layers 304-1, 304-2 to 304-M, 306 and 308 respectively include neurons 310-1, 310-2, 310-3 to 310-N; 312-1, 312-2, 312-3 to 312-P; 314-1, 314-2, 314-3 to 314-Q; 316-1, 316-2, 316-3 to 316-R; and 318-1, 318-2, 318-3 to 318-S.

In certain implementations, the DL/ML model 300 and artificial neural networks (e.g. artificial neural network 302) are trained as to use case of the information handling system 100. Examples of use case include work-load levels, charge levels, optimization recommendations, software features, security features, warranty, etc. Each use case can have its own artificial neural network. In certain implementations, if use cases are tied together in a business offering, (e.g., a security upgrade is available if higher level of warranty is signed up for), then the use case neural networks can be "daisy chained."

Neurons of the neural network 302 can receive input, combine the input with their internal state (i.e., activation) and an optional threshold using an activation function, and produce output using an output function. In certain implementations, initial inputs are data external to artificial neural network 302 are represented by input data 310. Input data 310 can include various resource information from the configuration of information handling system 100. The various data inputs are represented by inputs 320-1, 320-2, 320-3 to 318-T. In certain embodiments, the artificial neural network 302 can be "daisy-chained" with other artificial neural networks, such as when use cases are tied together.

The inputs 320 can be directed to resources of the information handling system that include computing (e.g., central processing unit), memory (e.g., random access memory, read only memory, storage, etc.), input/output (I/O), power (e.g., battery, charging), etc. For example, if an objective is to optimize and provide the best battery charging mode, the following inputs can be input to artificial neural network 302, and particular to input layer 304-1: battery temperature; time on battery; time on AC; total hours used; time in rest; charge rate; discharge rate; charge voltage; discharge voltage; avg. % discharge; avg. % charge.

For example, outputs for this battery optimization, can be "fast charging", "standard charging", and "slow charging". The artificial neural network 302, and specifically layers 304, can be implemented to derive performance level outputs based on received inputs of a particular configuration of the information handling system 100. In this example the performance level outputs are sent from layer 304-M to layer 306.

In certain implementations, the layer 306 can be considered as an output layer of the artificial neural network 302, and can be implemented for performance level classification, providing output classes as to different performance levels which can be identified as output nodes 316-1, 316-2, 316-3 to 316-R. The layer 306 can be considered as a "softmax" layer. For certain implementations, the "softmax" layer 306 provides probabilities for performance levels or output classes as identified by output nodes 316-1, 316-2, 316-3 to 316-R. The probabilities relate to optimal performance as to the level or class, where the values can range from "0" to "1". For example, output node 316-1 can be associated with a "performance level 1" and have a value of 0.3. Output node 316-2 can be associated with a "performance level 2" and have a value of 0.1. Output node 316-3 can be associated with a "performance level 3" and have a value of 0.6. Output node 316-R can be associated with a "performance level 4" and have a value of 0.1.

The "softmax" layer 306 can have multiple levels or classes or intermediary levels. In certain implementations, for higher class/level performance, there may be a desire to provide different options or sublevels and include greater detail and specificity as to performance class or level. Therefore, multiple intermediary levels or classes can be provided.

In certain implementations, the performance levels are mapped to "licensing levels", where a licensing level is identified as "free" (i.e., included in base package) or "paid" (i.e., offered as an upgrade). In this example, layer 308 is implemented as a licensing layer (licensing layer 308), output nodes/neurons 316 provide one to one input to licensing nodes/neurons 318 (i.e., same number of nodes/neurons). For certain implementations, the licensing layer 308 and nodes/neurons 318 provide weights, such a binary value of "0" or "1". "0" indicates disabled, and "1" indicates enabled performance level. In certain implementations for a base package, "free" performance levels can be enabled (i.e., node/neuron 318 with value of "1") and extra cost or "paid" performance levels can be disabled (i.e., node/neuron 318 with value of "0"). In this example, before an upgrade, nodes/neurons 318-1 and 318-2, and their correlated performance levels (i.e., performance levels 1 and 2) are shown to be enabled. Nodes/neurons 318-3, 318-S are shown their correlated performance levels (i.e., performance levels 3 and 4) are shown to be disabled.

Layer 322 represents the activation or deployment of performance levels. Deployment layer 322 includes deployment nodes/neurons 324-1, 324-2, 324-3 to 324-U. Licensing nodes/neurons 318 provide one to one input to deployment nodes/neurons 324 (i.e., same number of nodes/neurons). In this example, performance level/classes 324-1 and 324-2 are shown to be deployed at the information handling system. 100. In certain implementations, a hosting application operates with deployment layer 322 to provide (switch/flip) to provide the appropriate performance levels.

Figure 4:
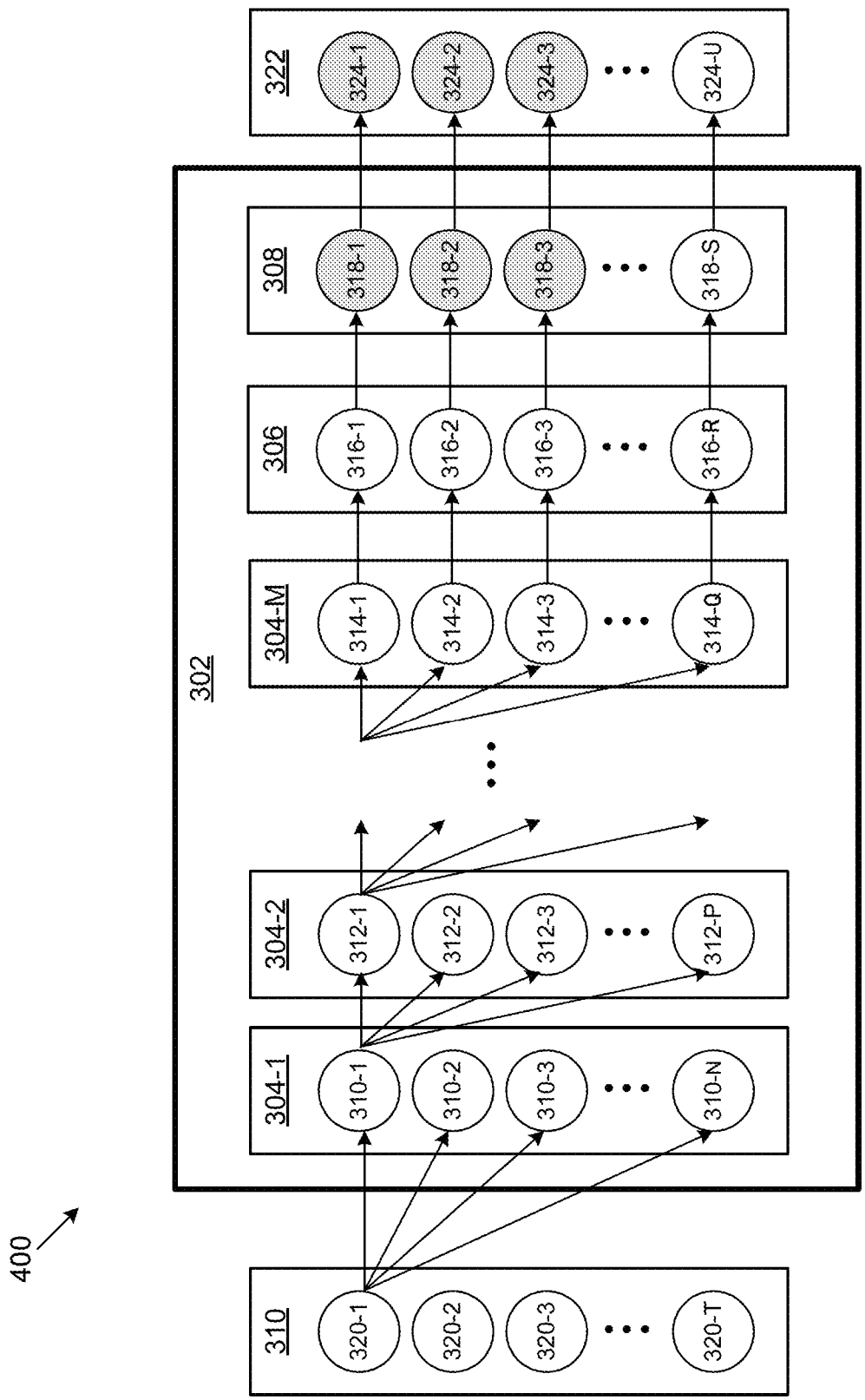
FIG. 4 is a simplified block diagram of a deep learning (DL) or machine learning (ML) model or DL/ML model, after an upgrade of multi-tiered offerings.

FIG. 4 is a block diagram of a deep learning (DL) or machine learning (ML) model or DL/ML model, after an upgrade of optimization performance level. As discussed in FIG. 3, output node 316-1 can be associated with a "performance level 1" and have a value of 0.3. Output node 316-2 can be associated with a "performance level 2" and have a value of 0.1. Output node/neuron 316-3 can be associated with a "performance level 3" and have a value of 0.6. Output node 316-R can be associated with a "performance level 4" and have a value of 0.1. Therefore, a recommendation can be made by the artificial neural network 302 to a user 202 or administrator 208 to upgrade to the performance level/class represented by node/neuron 316-3. The information handling system is already enabled with performance levels/classes (i.e., performance levels 1 and 2) represented by nodes/neurons 316-1 and 316-2. Performance level/class (i.e., performance level 4) represented by node/neuron 318-S provides only a "0.1" probability, while performance level/class (i.e., performance level 3) represented by node/neuron 318-3 provides a "0.6" probability. After the upgrade, node/neuron 318-3 correlated performance levels (i.e., performance level 3) is shown to be enabled. Node/neuron 318-S and its performance level (i.e., performance level 4) remains disabled.

Therefore, when the optimizer, DL/ML model 118 is being used in a trial phase that implements lower level license, output levels/classes applicable to that level license are given a weight of "1", and the rest of the output levels/classes are given a weight of "0". When the optimizer, DL/ML model 118 is used on the edge, such as by an application, information handing information 100 inputs are provided and the optimizer, DL/ML model 118 calculates the output levels/classes. In certain implementations, before presenting/outputting the output levels/classes, probabilities of the output levels/classes are multiplied by the weights of the licensing layer and the resulting output levels/classes are corrected. When user 202 or administrator upgrades to a higher level of license, an application can switch/flip "0" weights to "1" weights on licensing layer 308.

For example, the optimizer, DL/ML model 118 can recommend four types of charge modes (e.g., Primary AC, Standard, Express 1, Express 2) with Express 2 being reserved for paid license and rest are "free." When the optimizer, DL/ML model 118 is in trial license, even if the data and model point to Express 2, the licensing layer 308 will zero out that recommendation and present Express 1. When user upgrades the license, the optimizer, DL/ML model 118 will simply switch weights of the licensing layer 308. to 1, and Express 2 will be no long be available as a recommendation.

Figure 5:
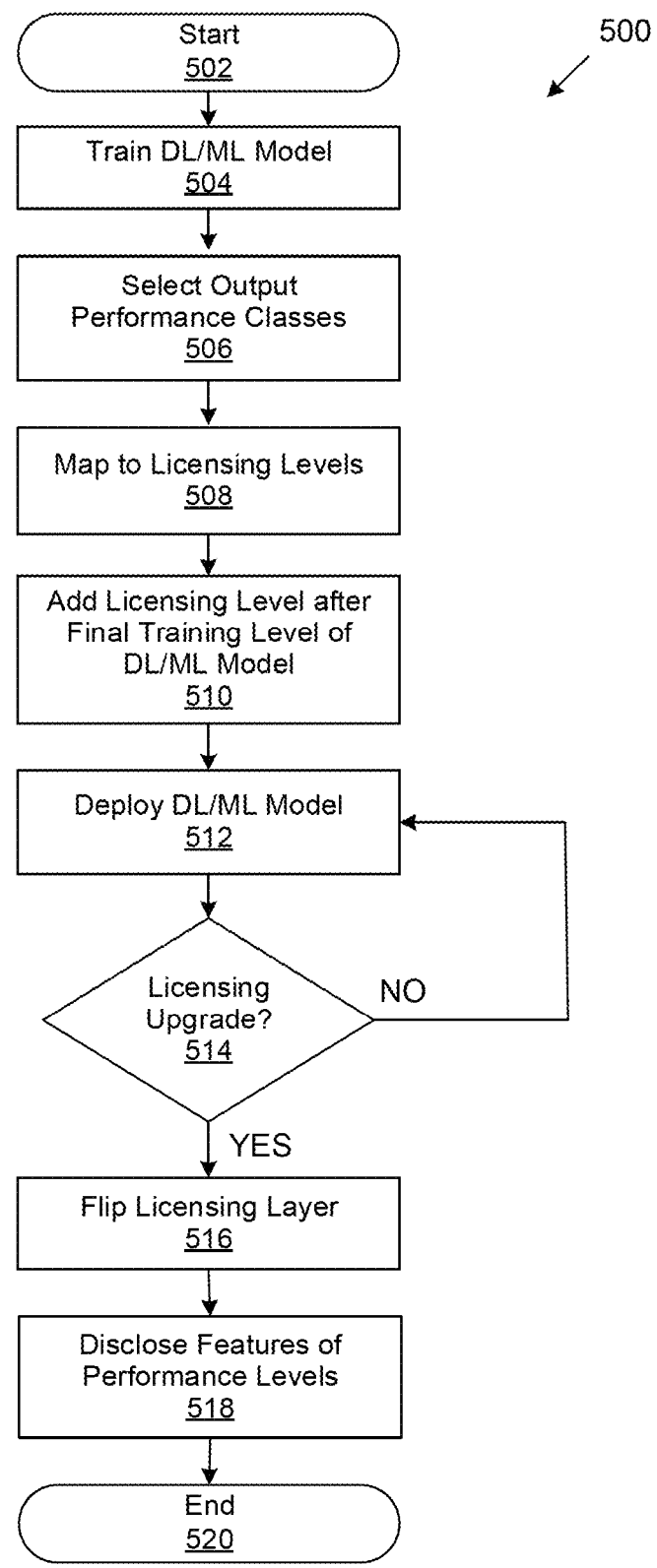
FIG. 5 is a general flowchart for configuring and offering upgrade capability to optimize information handling systems.

FIG. 5 is a generalized flowchart 500 for configuring and offering upgrade capability to optimize information handling systems. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502 the process 500 starts. At step 504, a deep learning/machine learning (DL/ML) model is trained base use case. The DL/ML model can include artificial neural networks that is trained. Use case examples can include work-load levels, charge levels, optimization recommendations, software features, security features, warranty, etc. In certain implementations, if use cases are tied together in a business offering, then the use case neural networks can be "daisy chained."

At step 506, output performance levels or classes are selected. At step 508, the performance levels or classes are mapped to licensing levels. The mapping can identify "free" (base) level classes and "paid" (upgrade) level classes. The total number of "free" and "paid" classes equal the number of output classes or levels of the DL/ML model or artificial neural network.

At step 510, a licensing layer is added after the final training level of the DL/ML model or artificial neural network. Weight multiplier can be implemented at the licensing layer, where "1" indicates enabled ("free" level classes prior to upgrade) and "0" indicates disabled ("paid" level classes prior to upgrade).

At step 512, the DL/ML model or artificial neural network is deployed. In certain implementations, the deployment is through a host application implementing an application program interface (API) with the licensing layer to flip a weight multiplier from "0" to "1".

The DL/ML model or artificial neural network can provide an offer or recommendation for an upgrade as to performance level optimization. If a user or administrator does not desire an upgrade, following the "NO" branch of block 514, process 500 continues with step 512. Otherwise, if the user or administrator desires and upgrade, following the "YES" branch of block 514, at step 516, weights at the licensing are flipped to the "1" per the upgraded performance level classes.

At step 518, the features and capabilities as to the upgraded performance level classes are disclosed or provided to the information handling system.

At block 520, the process 500 ends.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Skilled practitioners of the art will recognize that many such embodiments are possible, and the foregoing is not intended to limit the spirit, scope or intent of the invention. Consequently, the invention is intended to be limited only by the spirit and scope of the appended claims, giving full cognizance to equivalents in all respects.

What is claimed is:

1. A computer-implementable method for configuring a deep learning/machine learning (DL/ML) model to optimize information handling systems:
    training the DL/ML model to optimize a particular configuration and use case for an information handling system and provide output level classes of an artificial neural network implemented as to performance level classification identified as output nodes of the artificial neural network;
    selecting output level classes identified as base or upgrade;
    mapping the output level classes to a licensing layer that enables or disables use of performance levels based on weights that enable base output level classes and disable upgrade output level classes; and
    offering an upgrade to the output level classes upon a determination of probabilities of performance output level classes.

2. The method of claim 1 further comprising deploying the upgrade output level classes upon acceptance of the offering.

3. The method of claim 2, wherein deploying is through a host application that interfaces with the licensing layer.

4. The method of claim 1, wherein the DL/ML model includes one or more artificial neural networks that perform the training.

5. The method of claim 1, wherein DL/ML model is included in a pre-installed host application on the information handling system.

6. The method of claim 1, wherein the output level classes include intermediary output level classes.

7. The method of claim 1 further comprising training the DL/ML model for other use cases that are offered together as a business offering.

8. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations configuring a deep learning/machine learning (DL/ML) model to optimize information handling systems executable by the processor and configured for:
        training the DL/ML model to optimize a particular configuration and use case for an information handling system and provide output level classes of an artificial neural network implemented as to performance level classification identified as output nodes of the artificial neural network;
        selecting output level classes identified as base or upgrade;
        mapping the output level classes to a licensing layer that enables or disables use of performance levels based on weights that enable base output level classes and disable upgrade output level classes; and
        offering an upgrade to the output level classes upon a determination of probabilities of performance output level classes.

9. The system of claim 8 further comprising deploying the upgrade output level classes upon acceptance of the offering.

10. The system of claim 9, wherein deploying is through a host application that interfaces with the licensing layer.

11. The system of claim 8, wherein the DL/ML model includes one or more artificial neural networks that perform the training.

12. The system of claim 8, wherein DL/ML model is included in a pre-installed host application on the information handling system.

13. The system of claim 8, wherein the output level classes include intermediary output level classes.

14. The system of claim 8 further comprising training the DL/ML model for other use cases that are offered together as a business offering.

15. A non-transitory, computer-readable storage medium embodying computer program code, the computer program code comprising computer executable instructions configured for:
    training the DL/ML model to optimize a particular configuration and use case for an information handling system provide output level classes of an artificial neural network implemented as to performance level classification identified as output nodes of the artificial neural network;
    selecting output level classes identified as base or upgrade;
    mapping the output level classes to a licensing layer that enables or disables use of performance levels based on weights that enable base output level classes and disable upgrade output level classes; and
    offering an upgrade to the output level classes upon a determination of probabilities of performance output level classes.

16. The non-transitory, computer-readable storage medium of claim 15 further comprising instructions configured for deploying the upgrade output level classes upon acceptance of the offering.

17. The non-transitory, computer-readable storage medium of claim 15, wherein the DL/ML model includes one or more artificial neural networks that perform the training.

18. The non-transitory, computer-readable storage medium of claim 15, wherein DL/ML model is included in a pre-installed host application on the information handling system.

19. The non-transitory, computer-readable storage medium of claim 15, wherein the output level classes include intermediary output level classes.

20. The non-transitory, computer-readable storage medium of claim 15 further comprising instructions for training the DL/ML model for other use cases that are offered together as a business offering.

\* \* \* \* \*